(12) United States Patent
Helt et al.

(10) Patent No.: US 11,269,923 B2
(45) Date of Patent: Mar. 8, 2022

(54) ABILITY TO VARY ON AND VARY OFF DATABASES SIMULTANEOUSLY ACROSS TWO SYSTEMS

(71) Applicant: International Business Machines Corporation, Armonk, NY (US)

(72) Inventors: Scott D. Helt, Rochester, MN (US); Kiswanto Thayib, Rochester, MN (US); Kristopher C. Whitney, Rochester, MN (US); Philip M. Albu, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 16/448,401

(22) Filed: Jun. 21, 2019

(65) Prior Publication Data

US 2020/0401605 A1   Dec. 24, 2020

(51) Int. Cl.
*G06F 16/27* (2019.01)
*G06F 12/12* (2016.01)
*G06F 12/1009* (2016.01)
*G06F 12/0804* (2016.01)

(52) U.S. Cl.
CPC ........ *G06F 16/273* (2019.01); *G06F 12/1009* (2013.01); *G06F 12/12* (2013.01); *G06F 12/0804* (2013.01)

(58) Field of Classification Search
CPC .... G06F 16/273; G06F 12/1009; G06F 12/12; G06F 12/0804
See application file for complete search history.

(56) References Cited

U.S. PATENT DOCUMENTS

| 10,255,143 | B2 | 4/2019 | Vijayan et al. |
| 2004/0215670 | A1 | 10/2004 | Holenstein et al. |
| 2016/0266991 | A1 | 9/2016 | Cho et al. |
| 2020/0401605 | A1* | 12/2020 | Helt ................ G06F 12/1009 |

\* cited by examiner

*Primary Examiner* — Etienne P Leroux
(74) *Attorney, Agent, or Firm* — Patterson + Sheridan, LLP

(57) ABSTRACT

Embodiments of the present disclosure provide techniques to vary on and vary off databases simultaneously across a pair of nodes in a mirroring environment. A dual vary off operation is initiated at a first node of the pair of nodes, the dual vary off operation to be performed on copies of a database respectively stored on the pair of nodes, the operation to be performed in tandem with the second node. At the first node the copy of the database stored on the first node is informed of the dual vary off operation, and an operating system of the first node is also informed of the dual vary off operation. Upon receipt at the first node of an indication from the second node that it has completed its vary off operation, the first node completes the dual vary off operation. An analogous technique is performed for a dual vary on operation.

20 Claims, 5 Drawing Sheets

ABILITY TO VARY ON AND VARY OFF DATABASES SIMULTANEOUSLY ACROSS TWO SYSTEMS

BACKGROUND

The present disclosure relates to mirroring environments, and more specifically, to varying on and varying off databases simultaneously across two systems.

In mirroring environments, such as, for example, Db2 Mirror, two independent auxiliary storage pool (IASP) copies can be respectively provided on two computing systems that are actively replicating and in synch with each other. However, according to standard procedures when a database, such as, for example, one provided in an IASP is taken off-line, there is a potential exposure. First, the IASP is taken off-line, or "varied off" from one of the computing systems. That IASP is then marked as "blocked" by the operating system of the computing system, and no changes are allowed to any of the replicated objects in the IASP. Meanwhile the IASP remains active on the other system of the pair, and, is marked as being in a "tracked" state. There, on the tracked system, an active IASP remains available, and changes may be made to any object within it. The system keeps track of all of these changes, and later syncs up just those changed objects. The first system to be taken off-line is thus out of sync with the second, and if brought online first, while it may be accessed, it remains in a blocked state and is not available for updates.

Thus, during resynchronization processing of databases in a Db2 Mirror environment the target node of the resynchronization is inconsistent due to the fact that updates are sent to the target node potentially out of order with respect to their original occurrence. Thus, as noted, the target node is not a viable option for recovery during the resynchronization processing, and, as a result, the mirroring environment is exposed to a potential failure on the node performing the resynchronization (i.e., the computing system taken offline last, which was put into the "tracked" state). As noted above, currently, when a database is taken offline from a replicating pair of system nodes, replication between the databases is suspended. When both databases are later brought back online together, replication is resumed and a resynchronization occurs. It is during this resync process that a power failure on the resynchronization source node before the data could be provided to the target node would result in that data being lost. If the data is mission critical, or, for example, if a loss of the data is commercially detrimental, such for example, a set of financial transactions of a customer that may be now lost and thus required to be re-performed after careful retracing, loss of such data simply cannot be allowed to happen.

Not only is the prior art "block one and track the other" approach to treating a database stored across a mirrored pair of nodes in an HA mirrored environment vulnerable to potential failure, as described above, it also takes time and management overhead to perform the resynchronization. In some contexts, such as, for example, where a seamless switch of a mirrored pair of HA nodes from one location to another is desired, or a similar seamless switch of one or more databases stored on such first pair of system nodes, the down time during a resynchronization of the blocked node by the tracked node is too long. Additionally, as noted, in the prior art's "block one and track the other" approach, when time is critical, and the desired result is to bring the pair of nodes back online in a fully active-active replicating mode, it is necessary to always first bring back online the node that was in the tracked status just prior to the pair being brought offline, then bring online the node that was in the "blocked" status, and then begin the resynchronization as soon as possible. This adds management overhead.

Additionally, it is often efficient to consolidate a given application, or suite of applications, within a single IASP, or a set of IASPs. Thus, in order to seamlessly move operations of these applications, for example, from a mirrored pair of HA system nodes at one site to a mirrored pair of system nodes at a second, new site, whether as part of disaster recovery, or, for example, due to required maintenance at the first site, all that need be done is move the one or more IASPs from the first site to the second site, and the application or applications consolidated in the one or more IASPs are immediately back in operation. To achieve this immediacy, the one or more IASPs need to be both brought offline, and then back online in a completely identical and synchronized state. This cannot currently be done in the "block one and track the other" approach, where there is always one system node still hosting an active copy of the database, both when first going offline, and then when first going online.

What is thus needed in the art are improved solutions to managing both taking offline, and online, one or more, or even all, databases stored across a pair of system nodes in a HA mirrored environment.

SUMMARY

According to one embodiment of the present disclosure, a method is provided. The method includes initiating, at a first node of a pair of nodes in a mirroring environment, a dual vary off operation of a database, a copy of the database stored on each of the first node of the pair of nodes and a second node of the pair of nodes, the operation to be performed in tandem with the second node. The method further includes, at the first node, informing the copy of the database stored on the first node of the dual vary off operation, informing an operating system of the dual vary off operation, waiting for an indication from the second node that it has completed its vary off operation, and in response to the indication from the second node, completing the dual vary off operation. A dual vary off operation is an advantageous advance over the prior art, inasmuch as it insures that both nodes of the pair of nodes of the mirroring environment remain completely in sync when taken offline. In embodiments, this feature is most useful when switching an entire mirrored environment form one location to another, for example, or in other situations where the additional overhead and time required to resynchronize.

In another embodiment, the method further includes determining, at the first node, if there are pending jobs using the database on either of the nodes, and in response to the determination, posting a message on the first node advising owners of pending jobs on either node to either cancel the dual vary off operation or to continue with it. This is advantageous inasmuch as once a first user initiates the dual vary off operation, there may be some additional time needed for pending jobs to clear. If that is the case, other users associated with those jobs may not be ready for a dual vary off, as that leaves no ability to continue the job for a time on one system node alone (which would then be tracked). Thus, a dual vary off operation needs to inform users that it is pending, and co-ordinate with them that it is to proceed. Accordingly, in embodiments, the message includes an indication that if the dual vary off operation is continued, all pending jobs using the database will be canceled.

In one embodiment, the method further includes flushing all changed pages of the database in main memory to disk.

According to a second embodiment of the present disclosure, a system is provided. The system includes one or more computer processors, and a memory containing a program which when executed by the one or more computer processors performs an operation. The operation includes initiating, at a first node of a pair of nodes in a mirroring environment, a dual vary off operation of a database, a copy of the database being stored on each of the first node of the pair of nodes and a second node of the pair of nodes, the operation to be performed in tandem with the second node. The operation further includes, at the first node, informing the copy of the database stored on the first node of the dual vary off operation, and informing an operating system of the dual vary off operation. The operation still further includes waiting for an indication from the second node that it has completed its vary off operation, and in response to the indication from the second node, completing the dual vary off operation.

In another embodiment, the operation further includes determining, at the first node, if there are pending jobs using the database on either of the nodes, and in response to the determination, posting a message on the first node advising owners of pending jobs on either node to either cancel the dual vary off operation or to continue with it. This is advantageous inasmuch as once a first user initiates the dual vary off operation, there may be some additional time needed for pending jobs to clear. If that is the case, other users associated with those jobs may not be ready for a dual vary off, as that leaves no ability to continue the job for a time on one system node alone (which would then be tracked). Thus, a dual vary off operation needs to inform users that it is pending, and co-ordinate with them that it is to proceed. Accordingly, in embodiments, the message includes an indication that if the dual vary off operation is continued, all pending jobs using the database will be canceled. Because the dual vary off operation was initiated at the first node, in an embodiment, messages regarding jobs pending at either node are posted on the first node. This is where users are likely to look for such messaging.

In one or more embodiments, completing the dual vary off operation further includes informing the database to end system tasks that support mirroring of the database between the pair of nodes. In one or more embodiments, completing the dual vary off operation further includes flushing all changed pages of the database in main memory to disk.

According to a third embodiment of the present disclosure, a computer-readable storage medium is provided. The computer-readable storage medium has computer-readable program code embodied therewith, the computer-readable program code executable by one or more computer processors to perform an operation. The operation includes receiving, at a first node of a pair of nodes in a mirroring environment, a dual vary on command indicating to perform a vary on operation on a database in tandem with a second node of the pair of nodes. The operation further includes inform a second node of the pair of nodes to initiate dual vary on processing, and receiving an indication from the second node to continue with the dual vary on processing. The operation still further includes waiting for an indication from the second node that it is ready to complete the dual vary on operation, and, in response to the indication from the second node, completing the dual vary on operation.

The operation of the third embodiment of the present disclosure, being the inverse of that of the method and operation of the first and second embodiments of this disclosure, is advantageous in allowing the same database or databases that were carefully taken offline in complete sync, to similarly be carefully brought online in complete sync. Once again, this obviates the database being in a different state on the two system nodes of the mirrored pair when first brought back online. In some contexts this is especially advantageous. This is where a flurry of activity begins as soon as the one or more databases (or, at the system level, all of the databases) are brought back online. In the prior art, where, when the one or more databases are brought back online in the "track" and "block" states, and then significant activity occurs at the same time, the only version of the one or more databases that can accept changes may receive a large number of them, further exacerbating the asynchronous relationship of the two copies of the one or more databases, and further extending the time required for resynchronization, and thus the time in which there is an exposure.

Thus, the operation of the third embodiment advantageously avoids this problem. As an example, the one or more IASPs that are brought back online using the dual vary on operation of the third embodiment may support trading applications, and as soon as the IASPs are dual varied on there is a flurry of trading activity in a securities or commodities exchange, the trades executed through the one or more applications consolidated in IASPs that are stored across the system nodes of the mirrored environment. In such a case it is highly advantageous to have both databases (or sets of databases) be completely in sync, and operating in an active-active state, as soon as they are varied on, so that all trades and related activity are replicated.

DETAILED DESCRIPTION

Figure 1:
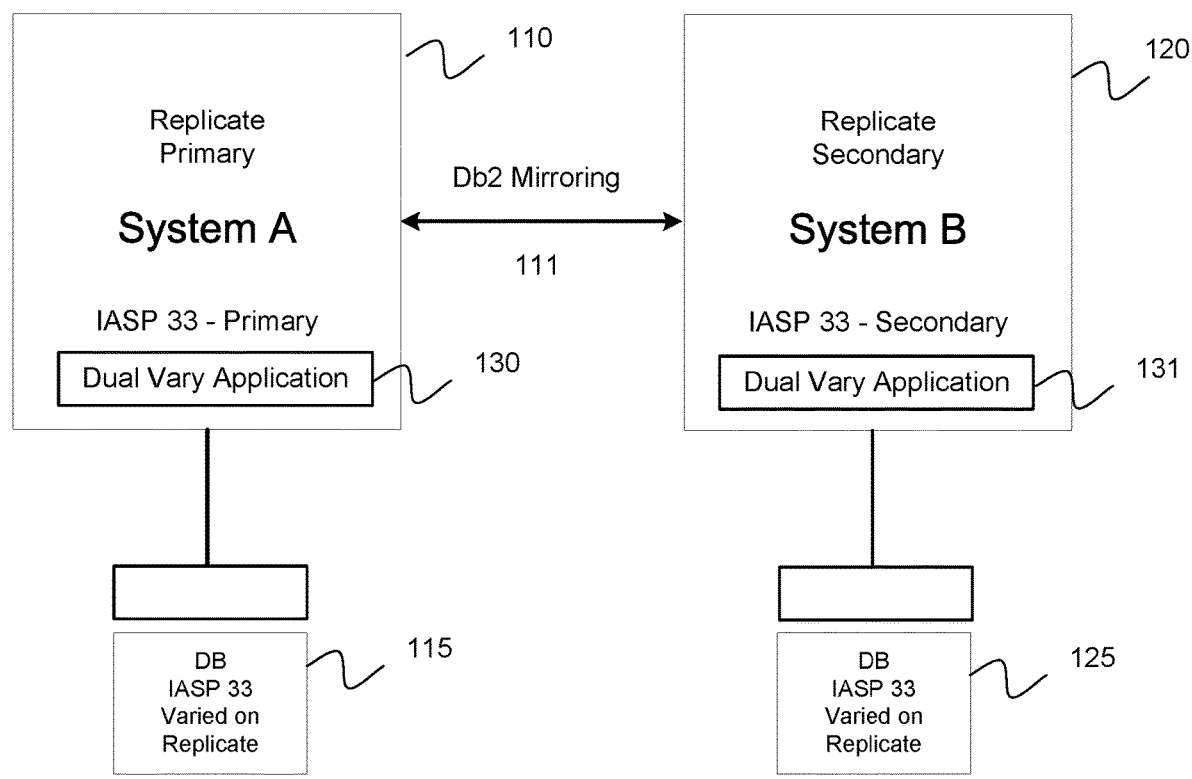
FIG. 1 illustrates an example pair of nodes in a mirrored environment, each configured to execute dual vary processing, according to one embodiment disclosed herein.

Embodiments of the present disclosure provide techniques to perform vary on and vary off operations, where two nodes in a mirrored environment act in tandem. Such tandem operations may be referred to herein as "dual vary", or, more precisely, as "dual vary on" and "dual vary off", respectively. As noted above, standard vary off and vary on operations create an exposure during resynchronization, where only one of the databases is up to date, and where the other, having been brought offline first, is thus initially in a blocked state. If the resynchronization source system (the database in the "tracked" state) experiences a power failure, the tracked changes to its (more current) version of the database may be lost. Accordingly, in embodiments, to avoid this exposure during resynchronization, as well as to remove the problems in marking the database as stored on one of the mirrored pair of systems as "blocked" and the other version of the database, stored on the other system of the mirrored pair as "tracked", the ability to take a pair of Db2 Mirrored databases offline together, e.g., a dual vary off, is provided. In embodiments, the two databases remain absolutely in sync and can later be brought back online together, both being in an equal state, and this not requiring resynchronization. In such embodiments, each of the mirrored systems maintains a viable backup in the event of a failure. As a result, when the mirrored pair is taken offline, whether for disaster recovery or other purposes, both systems are in sync, and a subsequent "dual vary on" process may begin on either of them.

In embodiments, a dual vary implementation may be accomplished by adding specific hooks within vary on and vary off processing of databases on system nodes so as to coordinate that processing across the two Db2 Mirrored nodes. In embodiments, this allows for two Db2 Mirrored nodes to remain absolutely in sync and for either node to take over in the event of a failure while maintaining consistency. In such embodiments, there is no exposure to a single node event as there is when a required resynchronization is in progress. Additionally, if both Db2 Mirrored databases are brought offline together and remain absolutely in sync (whether the two databases remain on the same nodes, or, for example, if they switch over to a separate pair of disaster recovery nodes) in the event that only a single database is subsequently brought online before the other database, either one of them may be the one brought online first and made available for updates. This contrasts with the current requirement, as noted above, that if Db2 Mirrored databases are brought offline one after the other, it is only the last one that went offline that is available to be brought online to be available for updates, whereas the first database to go offline would be in a blocked state, and not available for updates.

Similarly, in embodiments, a dual vary on operation, is provided. The dual vary on operation is the inverse of a dual vary off operation, described above. Dual vary on capability is highly advantageous in allowing the same database or databases that were carefully taken offline in complete sync, to similarly be carefully brought online in complete sync. Once again, this obviates the database or databases being in a different state on the two system nodes of the mirrored pair when first brought back online. In some contexts this is especially advantageous. This is where a flurry of activity begins as soon as the one or more databases (or, at the system level, all of the databases) are brought back online. In the prior art, where, when the one or more databases are brought back online in the "track" and "block" states, and then significant activity occurs at the same time, the only version of the one or more databases that can accept changes may receive a large number of them, further exacerbating the asynchronous relationship of the two copies of the one or more databases, and further extending the time required for resynchronization, and thus the time in which there is an exposure.

Thus, a dual vary on operation advantageously avoids this problem. As an example, the one or more IASPs that are brought back online using the dual vary on operation of the third embodiment may support a suite of applications for a hospital, first responder, or emergency room, and may provide records management and support, including accessing and updating medical records, including accessing by medical personnel of changes made in real time to such medical records. If, as soon as the IASPs are dual varied on there is a flurry of activity in succession with one or more patients, the records of treatments performed, medical histories taken, lab results, and drugs administered through the one or more applications consolidated in IASPs that are stored across the system nodes of the mirrored environment are in flux. In such a case it is highly advantageous to have both databases (or sets of databases) in which these medical practice management applications are consolidated to be completely in sync, and operating in an active-active state, as soon as they are varied on, so that all critical (and possibly life-saving) activity is replicated.

FIG. 1 illustrates an example pair of nodes in a mirrored environment, according to one embodiment disclosed herein. With reference thereto, there are shown a first example system 110, System A, and a second example system 120, System B. System A and System B are in a mirroring environment, as shown by arrow 111. A mirroring environment is a continuous availability solution which offers the ability to keep database files synchronized between two nodes and can provide a recovery time objective close to zero. As shown in FIG. 1, the mirroring environment may be the "Db2 Mirror" solution provided by IBM Corporation. Stored on each of System A 110 and System B 120, respectively, is a copy of a database. The database is an independent auxiliary storage pool, or IASP, which is a collection of disk units that can be brought online or taken offline and kept independent of the rest of the data on a storage system. The example database in FIG. 1 is labeled "IASP 33." One copy of IASP 33 115 is stored on System A 110, and a second copy of IASP 33 125 is stored on System B. Due to the mirroring environment, the two copies 115, 125 are in sync and identical, indicated by the term "replicate" appearing on each of the two copies of IASP 33. Thus a change made by a user on System A to IASP 33 115, is immediately replicated on IASP 33 125 stored on System B. Both copies of IASP 33 are in an active state, which means they are available to be changed. The fact that they are on and operative on their two respective systems is indicated by the term "varied on" provided on each copy of IASP 33. As described more fully below, in embodiments, the two copies of IASP 33 may be varied on and varied off in tandem, thereby insuring their synchronization when taken offline, as well as when put back online.

Continuing with reference to FIG. 1, System A and System B are each provided with dual vary application 130 and 131, respectively. Dual vary application 130, 131 facilitates varying a database that is stored on each system on or off in a coordinated tandem operation involving both systems operating in parallel so that both database copies are in sync prior to being varied off, such that no additional resynchronization step is needed when they are once again varied on, in tandem. The elements and functionality of dual vary application 130, 131 are described more fully below, with reference to FIG. 2.

Figure 2:
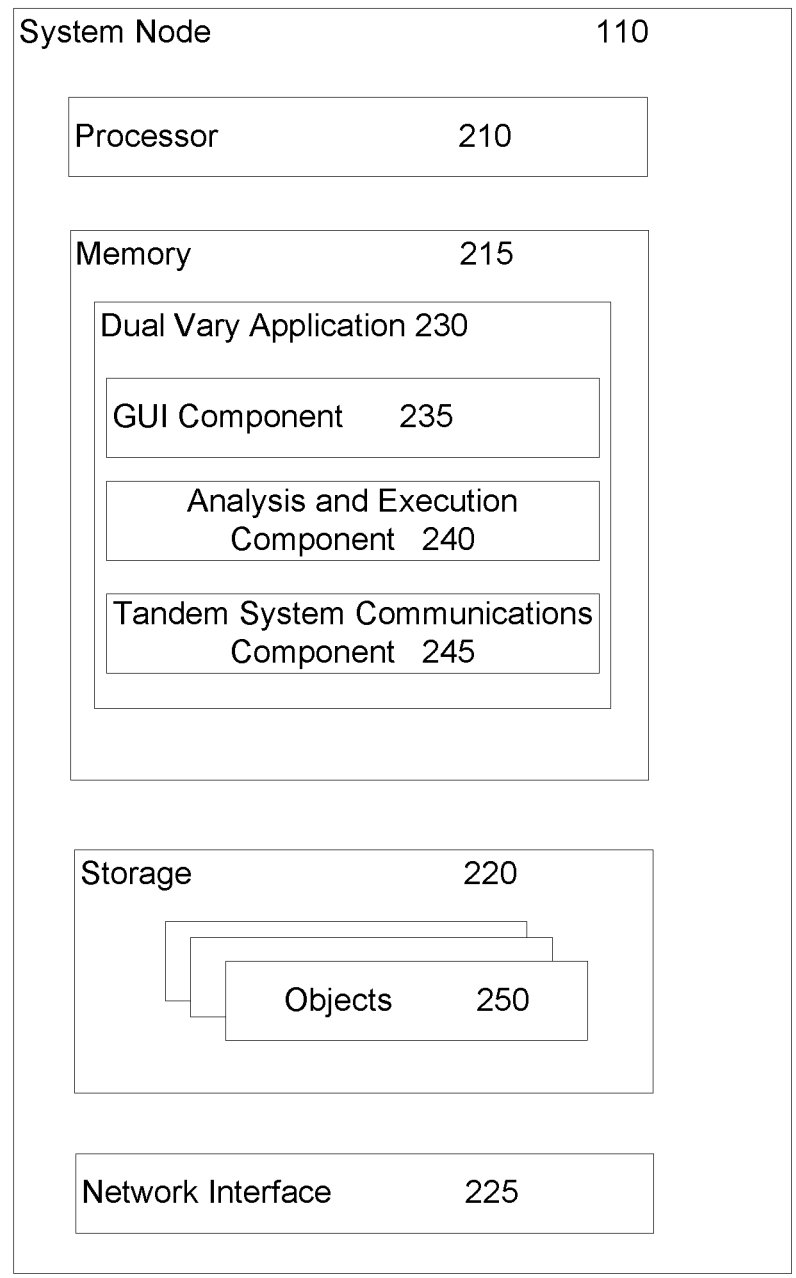
FIG. 2 is a block diagram illustrating detail of one of the example nodes of FIG. 1 configured to execute dual vary processing, according to one embodiment disclosed herein.

FIG. 2 is a block diagram illustrating a System Node 110 configured to provide dual vary on and dual vary off processing, according to one embodiment disclosed herein. In the illustrated embodiment, the System Node 110 includes a Processor 210, Memory 215, Storage 220, and a Network Interface 225. In the illustrated embodiment, the Processor 210 retrieves and executes programming instructions stored in Memory 215, as well as stores and retrieves application data residing in Storage 220. The Processor 210 is generally representative of a single CPU, multiple CPUs, a single CPU having multiple processing cores, and the like. The Memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more databases, including IASPs. Via the Network Interface 225, the System Node 110 can be communicatively coupled with one or more other devices and components, such as other System Nodes 110, monitoring nodes, storage nodes, and the like.

In the illustrated embodiment, the Storage 220 includes a set of Objects 250. Although depicted as residing in Storage 220, in embodiments, the Objects 250 may reside in any suitable location. In embodiments, the Objects 250 are generally representative of any data (e.g., application data, saved files, databases, and the like) that is maintained and/or operated on by the System Node 110. As noted, Objects 250 may include IASP 33. As illustrated, the Memory 215 includes a Dual Vary Application 230. Although depicted as software in Memory 215, in embodiments, the functionality of the Dual Vary Application 230 can be implemented in any location using hardware, software, or a combination of hardware and software. Although not illustrated, the Memory 215 may include any number of other applications used to create and modify the Objects 250 and perform System on the System Node 110.

As illustrated, the Dual Vary Application 230 includes a GUI Component 235, an Analysis and Execution Component 240, and a Tandem System Communications Component 245. Although depicted as discrete components for conceptual clarity, in embodiments, the operations and functionality of the GUI Component 235, Analysis and Execution Component 240, and Tandem System Communications Component 245 may be combined or distributed across any number of components. In an embodiment, the Dual Vary Application 230 is generally used to implement, communicate regarding, and manage the varying on and varying off of database objects of Objects 250 in tandem with a partner system node (not shown) with which the System Node 110 forms a mirrored pair of nodes in a mirroring environment.

In an embodiment, the GUI Component 235 is used to generate and output graphical user interfaces (GUIs) for users, as well as receive input from users. In one embodiment, users can use the GUI Component 235 to send command to initiate a dual vary on or dual vary off operation, and to receive messages from System Node 110, or another system node (e.g., System B 120 of FIG. 1) regarding the dual vary processing. In some embodiments, the GUI Component 235 provides messaging regarding pending jobs using an IASP that is the subject of a dual vary off command, and requests user input as to whether continue those jobs and cancel the requested dual vary off, or whether to proceed with the dual vary off and allow those pending jobs to be canceled.

In some embodiments, the displayed GUI indicates the current status of a dual vary on or off operation, including when such an operation has completed. In some embodiments, the displayed GUI indicates the status of databases within the memory space of System Node 110, including databases that are the subject of a dual vary on or dual vary off command.

In the illustrated embodiment, the Analysis and Execution Component 240 receives information from the GUI Component 235 (e.g., input by a user), the Tandem Systems Communication Component 245 (e.g., input or messaging from another system node participating in the dual vary operation), or other applications. For example, in the case of dual vary off processing, the Analysis and Execution Component 240 determines whether there are pending jobs on a system node. In the illustrated embodiment, in the case of dual vary on processing, the Analysis and Execution Component 240 receives information from the GUI Component 235 (e.g., input by a user), the Tandem Systems Communication Component 245, or other applications, and coordinates states between the two system nodes involved in the dual vary on, including, for example, if two copies of an IASP respectively stored on two system nodes involved in the dual vary on were varied off in tandem, and thus in sync, or not. Or, for example, in some embodiments, the Analysis and Execution Component 240 monitors the progress of a dual vary operation, so as to coordinate its completion.

In one embodiment, the Tandem Systems Communication Component 245 is used to communicate with another system node of a mirrored pair during a dual vary operation. For example, in some embodiments, Tandem Systems Communication Component 245 contacts a system node that has not initiated a vary off operation to inform it that such an operation has been instructed, and to continue appropriate processing on that system node. In some embodiments, the Tandem Systems Communication Component 245 receives messages from such other system node that said other system node has completed vary off processing.

In one embodiment, the Tandem Systems Communication Component 245 contacts another system node that has not initiated the vary on operation that one has been instructed at System Node 110, and to initiate appropriate vary on processing on that other system node. In some embodiments, Tandem Systems Communication Component 245 receives messages from such other system node as to the state of synchronization between that other system node and System Node 110, and given the two system nodes being in sync, that System Node 110 is to continue with said other system node has completed vary off processing.

Similarly, in some embodiments, when the System Node 110 has essentially completed vary on processing, but has yet to change state to "available" (e.g., an indication of being available for receiving changes to the IASP that was the subject of the vary on instruction), the Tandem Systems Communication Component 245 is used to advise the other system node of that fact. In such embodiments, when the other system node is ready to change its state to "available", the Tandem Systems Communication Component 245 then receives a readiness message from such other system node, and communicates it to the Analysis and Execution Component 240, which, in turn, completes the dual vary on operation.

In one or more embodiments disclosed herein, a dual vary off operation may be performed by two active mirrored nodes acting in tandem. The dual vary off operation takes a replicated IASP, such as IASP 33 in FIG. 1, offline in tandem, and essentially simultaneously, such that the two IASPs remain completely in sync.

Figure 3A:
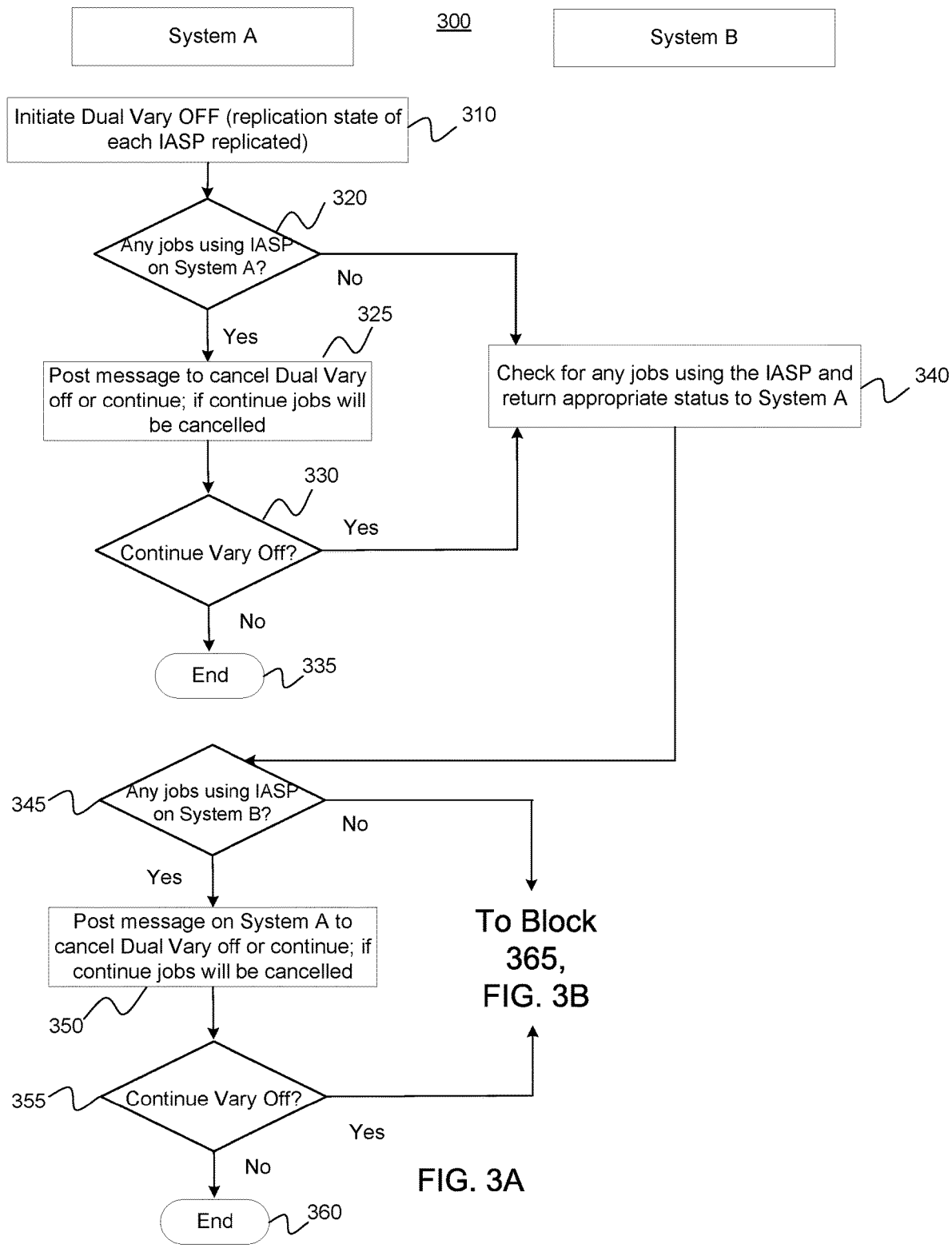
FIG. 3A is a flow diagram illustrating a first portion of a method of executing a dual vary off operation by two mirrored nodes acting in tandem, according to one embodiment disclosed herein.
Figure 3B:
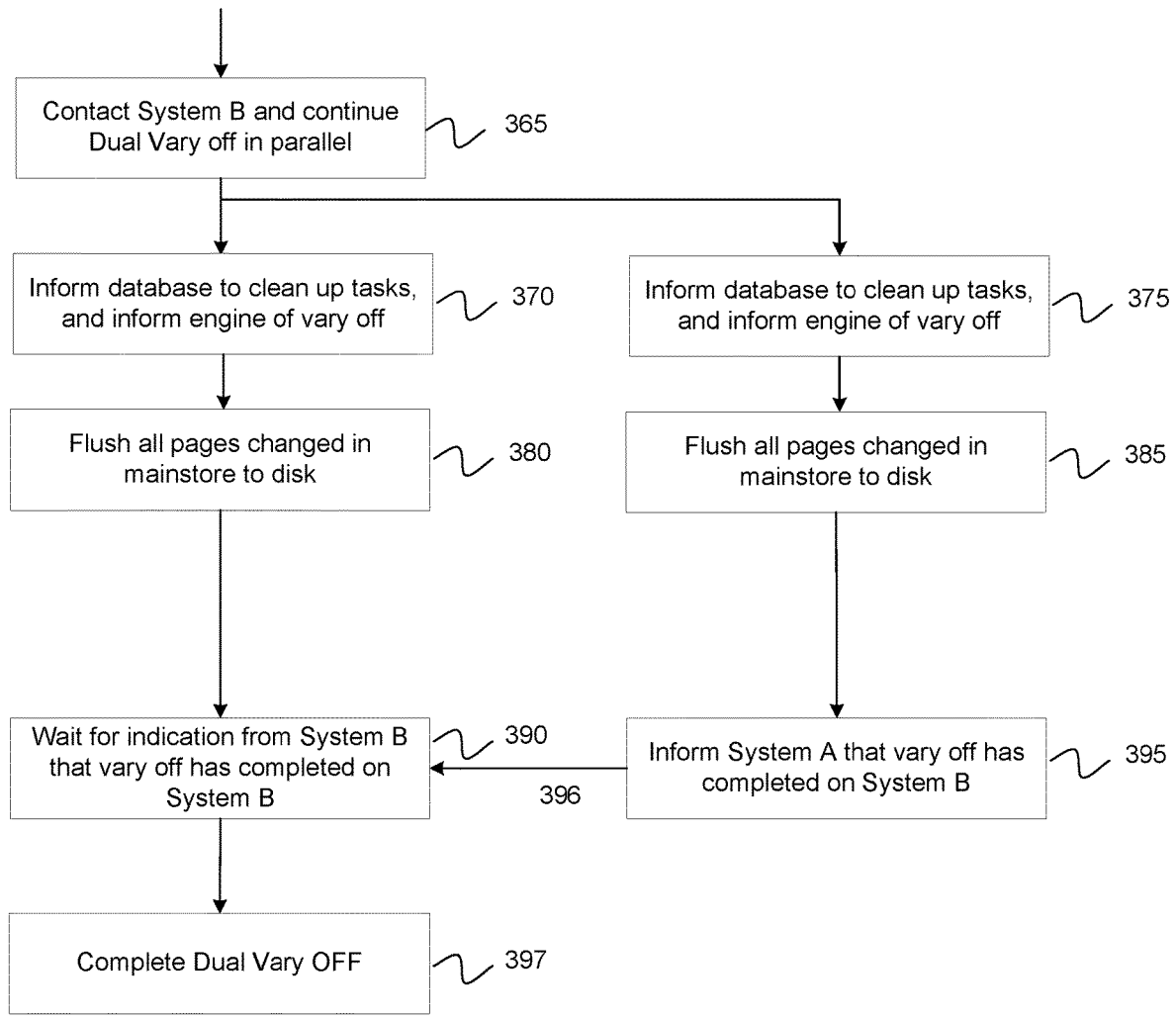
FIG. 3B is a flow diagram illustrating a second portion of the dual vary off method of FIG. 3A, according to one embodiment disclosed herein.

FIGS. 3A and 3B together illustrate a method 300 of executing a vary off operation in tandem, by two mirrored nodes, according to one embodiment disclosed herein. In the example of FIGS. 3A and 3B, the database being varied off in tandem is an IASP. For ease of illustration, as well as readability, FIG. 3A illustrates an initial portion of the method, and FIG. 3B a final portion of the method. Method 300 includes blocks 310 through 397. In alternate embodiments method 300 may have more, or fewer blocks.

With reference to FIGS. 3A and 3B, it is noted that various blocks of the method are indicated as being performed in System A (left column of the figures), System B (right column of the figures), or in both System A and System B in parallel (similar blocks provided next to each other in both columns). Further, as noted above, in some embodiments, blocks of method 300 may be performed by various components of Dual Vary Application 230, of FIG. 2, described above.

Continuing with reference to FIG. 3A, method 300 begins at block 310, where System A initiates a dual vary off operation. For example, a dual vary off command may have been sent from a user of System A, and System A responds appropriately. System A and System B may be, for example, those as shown in FIG. 1, and the referent of the dual vary off operation may be IASP 33, a copy of which is stored on each of System A and System B. As shown in block 310, as part of the initiation of the dual vary off operation, the replication state of each IASP is here replicated.

In one or more embodiments, a dual vary off command may be received by either of the two systems comprising the mirrored pair. For ease of illustration FIGS. 3A and 3B show System A as the initiator, but it could just as well be System B.

Continuing with reference to FIG. 3A, method 300 proceeds to query block 320, where it is determined if there are any jobs on System A using the IASP. If Yes at block 320, then method 300 proceeds to block 325, where a message is posted to users, to either cancel the dual vary off operation, or to indicate a continuation of it. Further, the message may indicate that if it is chosen to continue with the dual vary off operation, the pending jobs using the IASP will be canceled. From block 325, method 300 proceeds to query block 330, where it is determined, given the pending jobs and the message, whether the dual vary off operation is to proceed. If No, then method 300 terminates at block 335. However, if Yes at query block 330, then method 300 proceeds to block 340.

Similarly, if the response at query block 320 was No, and there are no pending jobs using the IASP, then method 300 proceeds directly to block 340. At block 340 it is determined if, on System B, there are any jobs using the IASP, and an appropriate status is returned to System A. From block 340, method 300 proceeds to another set of query blocks and responses to them, this time regarding jobs that may be pending on System B that are using the IASP which is the subject of the dual vary off command.

Thus, from block 340, method 300 proceeds to query block 345, where it is determined if there are any jobs on System B using the IASP. If Yes at block 345, then method 300 proceeds to block 350, where a message is posted on System A, to either cancel the dual vary off operation, or to indicate a continuation of it. Further, the message may indicate that if it is chosen to continue with the dual vary off operation, the pending jobs using the IASP will be canceled. It is noted that the message regarding System B is nonetheless posted to System A, because System A is the initiator of the dual vary off operation, and any users would be looking on System A for related messaging. From block 350, method 300 proceeds to query block 355, where it is determined, given the pending jobs and the message, whether the dual vary off operation is to proceed. If No, then method 300 terminates at block 360. However, if Yes at query block 355, then method 300 proceeds to block 365 of FIG. 3B.

Similarly, if the response at query block 345 was No, and there are no pending jobs using the IASP, then method 300 proceeds directly to block 365 of FIG. 3B, described below.

With reference to FIG. 3B, at block 365 System A contacts System B to continue the dual vary off operation in parallel with System A doing the same. From block 365, method 300 runs in parallel on both System A and System B, where at blocks 370 and 375 each system informs its respective copy of the database to clean up tasks and each system informs its respective operating system (here indicated by the term "engine") of the vary off operation. It is noted that at blocks 370 and 375 the phrase "clean up tasks" refers to the fact that each database has multiple system tasks that are running on each system in order to support mirroring operations. Thus, as the IASPs are varied off, those system level database tasks need to be ended. Additionally, the term "engine" may refer to an internal component which is involved with mirroring operations, and because the engine is a part of the operating system, it may be understood in a broader context as the operating system.

From blocks 370 and 375 method 300 proceeds in parallel to blocks 380 and 385, where all pages of the database that have changed in main memory (also known as "mainstore"), are flushed to disk. This is because main memory is volatile, and the changes to the IASP need to be stored in it and replicated prior to varying off.

From blocks 380 and 385, method 300 proceeds in parallel to blocks 390 and 395. At block 390, System A, the initiator of the dual vary off operation, waits for an indication from System B that it has completed its vary off operation. At block 395, System B does exactly that, and informs System A that vary off has completed on System B, as shown by arrow 396.

Finally, from block 390, method 300 proceeds to block 397, where the dual vary off operation has completed. At this point, each copy of the IASP is offline, and cannot be accessed or changed. Moreover, because the vary off of each copy of the IASP was performed in tandem, the two databases are now wholly in sync.

Figure 4:
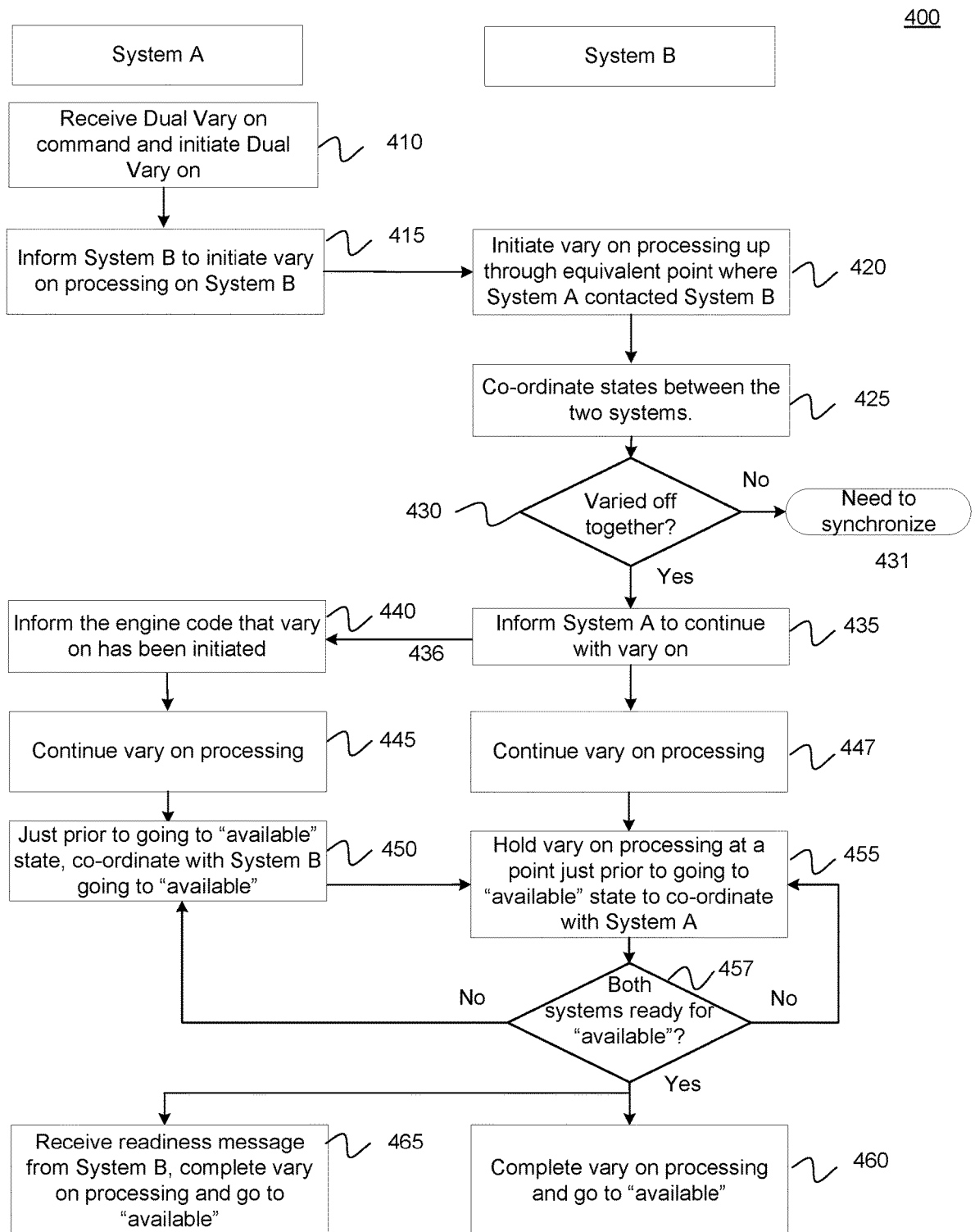
FIG. 4 is a flow diagram illustrating a method of executing a dual vary on operation by two mirrored nodes acting in tandem, according to one embodiment disclosed herein.

FIG. 4 illustrates the inverse of method 300 of FIGS. 3A and 3B. FIG. 4 illustrates a method 400 of executing a vary on operation in tandem, by two mirrored nodes, according to one embodiment disclosed herein. In one or more embodiments, a dual vary on command may be received by either of the two systems comprising the mirrored pair. In one or more embodiments, the dual vary on operation takes a replicated IASP, such as IASP 33 in FIG. 1, which had been previously taken offline, back online. This is done in tandem, and essentially simultaneously, such that the two IASPs remain completely in sync, and there is no need to synchronize them prior to taking them to an active state.

Further, as noted above, in some embodiments, blocks of method 400 may be performed by various components of Dual Vary Application 230, of FIG. 2, described above.

In method 400, initially a dual vary on command is received by a first of the two systems, from a user. If the two systems were taken offline using the dual vary off command and processing described above, the dual vary on command may be received by either of the two systems.

Method 400 includes blocks 410 through 465. In alternate embodiments method 400 may have more, or fewer, blocks. As was the case in FIGS. 3A and 3B, with reference to FIG. 4, various blocks are indicated as being performed in System A (left column of the figures), System B (right column of the figures), or in both System A and System B in parallel. System A and System B may be System A 110 and System B 120 as shown in FIG. 1, for example, and the database that is being varied on in method 400 may be IASP 33, as further shown in FIG. 1.

Continuing with reference to FIG. 4, method 400 begins at block 410, where a dual vary on command is received from a user. Upon receipt of the command, System A initiates a dual vary on operation. From block 410 method 400 proceeds to block 415, where System A informs System B to initiate vary on processing on System B. From block 415, method 400 proceeds to block 420, where System B initiates vary on processing up through an equivalent point where System A contacted System B, e.g., at block 415. For example, the point that is referred to in block 420 is an internal point in vary on processing right after a system's internal code has made the disk units accessible internally to an operating system. Thus, this is the point in vary on processing when the operating system can first access the disk units of the IASP in order to determine what the replication state stored within the IASP is. It is to this point in vary on processing that System A would reach before executing bock 415 and contacting System B. Similarly, in embodiments, that is how far in the vary on processing that System B would proceed in block 420 so that it could also access the replication state on System B.

From block 420, method 400 proceeds to block 425, where System B coordinates the states between the two systems. For example, when System A performed its vary on processing up through box 415, it accesses the replication state stored within the IASP on System A and passes along that state value in the communication described at block 415 between blocks 415 and 420. Once the processing on System B at block 420 had completed and System B was then able to access its own replication state of the IASP on System B, it then compares those two values in box 425 and determines if the two IASPs are absolutely in sync, as would be the case if a dual vary off had been implemented, as described above, or not.

From block 425, method 400 proceeds to query block 430, where it is determined if the two databases were varied off together. If Yes at query block 430, then method 400 proceeds to block 435, next described. If, however, the response at query block 430 is no, then method 400 proceeds to termination block 431, because a synchronization is required. It is noted that method 400 does not have to end here, but that before proceeding further, the two databases need to be resynchronized, in standard vary on processing.

Continuing with reference to FIG. 4, at block 435 System B informs System A to continue with the vary on operation, as shown by arrow 436 to block 440, on the System A side of the figure. At block 440, System A informs its operating system that a vary on has now been initiated. From blocks 435 and 440, method 400 proceeds in parallel to blocks 445 and 447, respectively, where each system continues with the vary on processing. From 445 and 447, method 400 proceeds in parallel to blocks 450 and 455, where each system holds back, after each essentially completing the vary on processing but not yet changing the state of their IASPs to "available", so that they may coordinate with each other. From block 455, method 400 proceeds to query block 457, where it is determined by System B whether both systems, System A and System B, are ready to change their states to "available", and thus be fully back on line, where each system has an active version of the IASP, and actively mirrors the other system. If both systems are ready to move to "available" status, then, in tandem, both systems complete the vary on processing and go to a state of "available." It is noted that in FIG. 1, for example, the two copies of database IASP 33 are in the "available" state, as each has varied on, and each is replicating the other.

Thus, if the response at query block 457 is Yes, then method 400 proceeds to blocks 460 and 465 in parallel. At block 460 System B completes the vary on processing and thus changes its state to "available", and at block 465 System A receives a readiness message from System B, e.g., the Yes response to query block 457, and in turn completes its vary on processing and changes its state to "available."

If, however, at query block 457 the response is No, and thus both systems are not yet ready to change their state, even if one is ready, then method 400 loops back to blocks 450 and 455, where the two systems continue to coordinate being ready to change their respective states.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., dual vary operations, including dual vary on, or dual vary off) or related data available in the cloud. For example, an IASP could be stored on each of a mirrored pair of systems in the cloud, and a dual vary application for the IASP could be instructed and performed on either of the pair of mirrored systems. In such a case, the dual vary application could take offline, or take online, two respective copies of the IASP 33 in tandem, and store an indication of the respective states of each IASP at a storage location in the cloud. Doing so allows a user to access this information from any computing system attached to a network connected to the cloud (e.g., the Internet). Similarly, users could access either copy of the IASP by accessing either of the mirrored pair of systems from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   initiating, at a first node of a pair of nodes in a mirroring environment, a dual vary off operation of a database, a copy of the database stored on each of the first node of the pair of nodes and a second node of the pair of nodes, the operation to be performed in tandem with the second node; and
   at the first node:
   informing the copy of the database stored on the first node of the dual vary off operation;
   informing an operating system of the dual vary off operation;
   waiting for an indication from the second node that it has completed its vary off operation; and
   in response to the indication from the second node, completing the dual vary off operation.

2. The method of claim 1, further comprising:
   receiving a user command at the first node to initiate the dual vary off operation.

3. The method of claim 1, wherein the dual vary off operation further comprises:
   determining, at the first node, if there are pending jobs using the database on either of the nodes; and
   in response to the determination, posting a message on the first node advising owners of pending jobs on either node to either cancel the dual vary off operation or to continue with it.

4. The method of claim 3, further comprising including in the message an indication that if the dual vary off operation is continued, all pending jobs using the database will be canceled.

5. The method of claim 1, wherein the pair of nodes are mirrored in a Db2 mirroring environment.

6. The method of claim 1, wherein the database is an independent auxiliary storage pool (IASP).

7. The method of claim 1, wherein completing the dual vary off operation further comprises informing the database to end system tasks that support mirroring of the database between the pair of nodes.

8. The method of claim 1, wherein completing the dual vary off operation further comprises flushing all changed pages of the database in main memory to disk.

9. A system, comprising:
   one or more computer processors; and
   a memory containing a program which when executed by the one or more computer processors performs an operation, the operation comprising:
   initiating, at a first node of a pair of nodes in a mirroring environment, a dual vary off operation of a database, a copy of the database being stored on each of the first node of the pair of nodes and a second node of the pair of nodes, the operation to be performed in tandem with the second node; and
   at the first node:
   informing the copy of the database stored on the first node of the dual vary off operation;
   informing an operating system of the dual vary off operation;
   waiting for an indication from the second node that it has completed its vary off operation; and
   in response to the indication from the second node, completing the dual vary off operation.

10. The system of claim 9, the operation further comprising:
    receiving a user command at the first node to initiate the dual vary off operation.

11. The system of claim 9, the operation further comprising:
    determining, at the first node, if there are pending jobs using the database on either of the nodes; and
    in response to the determination, posting a message on the first node advising owners of pending jobs on either node to either cancel the dual vary off operation or to continue with it.

12. The system of claim 11, wherein completing the dual vary off operation further comprises informing the database to end system tasks that support mirroring of the database between the pair of nodes.

13. The system of claim 11, wherein completing the dual vary off operation further comprises flushing all changed pages of the database in main memory to disk.

14. The system of claim 9, wherein the pair of nodes are mirrored in a Db2 mirroring environment.

15. A computer-readable storage medium having computer-readable program code embodied therewith, the computer-readable program code executable by one or more computer processors to perform an operation comprising:
    receiving, at a first node of a pair of nodes in a mirroring environment, a dual vary on command indicating to perform a vary on operation on a database in tandem with a second node of the pair of nodes;
    informing a second node of the pair of nodes to initiate dual vary on processing;
    receiving an indication from the second node to continue with the dual vary on processing;
    waiting for an indication from the second node that it is ready to complete the dual vary on operation; and
    in response to the indication from the second node, completing the dual vary on operation.

16. The computer-readable storage medium of claim 15, wherein the database is an IASP that is stored on each of the first node and the second node.

17. The computer-readable storage medium of claim 16, the operation further comprising:
    accessing a replication state of the IASP on the first node and passing that state value to the second node.

18. The computer-readable storage medium of claim 16, wherein the indication received from the second node that it is ready to complete the dual vary on operation includes an indication that the second node is ready to change a state of the IASP on the second node to available.

19. The computer-readable storage medium of claim 15, the operation further comprising:
    upon receiving the indication from the second node to continue with the dual vary on processing, informing an operating system of the first node that a dual vary on operation has been initiated.

20. The computer-readable storage medium of claim 15, wherein, as part of completing the dual vary on processing, the operation further comprises:

changing a state of the IASP on the first node to available.

\* \* \* \* \*